United States Patent [19]

Fleming et al.

[11] 4,057,790

[45] Nov. 8, 1977

[54] PERSONAL AID SIGNALLING SYSTEM

[76] Inventors: George William Fleming, P.O. Box 542, Virginia Beach, Va. 23451; Alfred N. Paul, 111 Washington Post Drive, Wilton, Conn. 06897

[21] Appl. No.: 653,532

[22] Filed: Jan. 29, 1976

Related U.S. Application Data

[63] Continuation-in-part of Ser. No. 473,201, May 24, 1974, abandoned.

[51] Int. Cl.[2] ........................ G08B 1/08; H04M 11/02

[52] U.S. Cl. ................................ 340/224; 340/164 R; 340/168 B; 340/147 SY; 340/171 R; 340/311; 325/64

[58] Field of Search .................. 340/311, 164 R, 224, 340/283, 318, 287, 288, 280, 168 B, 171 R, 361, 147 SY; 325/55, 63, 64, 111, 118, 302, 326, 322, 325, 364, 394, 392

[56] References Cited

U.S. PATENT DOCUMENTS

| | | | |
|---|---|---|---|
| 2,951,230 | 8/1960 | Cadden | 340/168 |
| 3,384,873 | 5/1968 | Sharma | 340/147 SY |
| 3,510,777 | 5/1970 | Gordon | 325/55 |
| 3,684,964 | 8/1972 | Bright et al. | 340/147 SY |
| 3,768,090 | 10/1973 | Williams | 340/311 |
| 3,798,549 | 3/1974 | Ollinger et al | 325/322 |
| 3,851,251 | 11/1974 | Wigner et al. | 340/311 |
| 3,852,713 | 12/1974 | Roberts et al. | 340/164 R |
| 3,855,575 | 12/1974 | Leuschner | 325/325 |

*Primary Examiner*—John W. Caldwell, Sr.
*Assistant Examiner*—Donnie L. Crosland
*Attorney, Agent, or Firm*—H. Gibner Lehmann; K. Gibner Lehmann

[57] ABSTRACT

A system for use especially by the infirm or elderly for summoning the help of others who are located a distance away. The system includes a radio-type transmitter adapted to be carried in a pocket of the elderly person, and a receiver/decoder and signalling device located at an adjoining area from which signals for help or assistance can be readily observed. The transmitter unit can be activated by means of a switch or button, and emits short bursts of a modulated signal having a unique, preselected frequency. The signal is picked up by the receiver and demodulated by a detector. The decoder comprises a sensing circuit, including a gated, resettable counter which measures the frequency of the detected signal. Means connected with the counter output trigger an alarm when the transmitted frequency having the proper modulating signal is received. By the above arrangement a plurality of similar units can be disposed in the same area and operated with slightly different modulating frequencies without causing interference or interaction between them.

6 Claims, 2 Drawing Figures

PERSONAL AID SIGNALLING SYSTEM

CROSS REFERENCE TO RELATED APPLICATIONS

The present application is a continuation-in-part of our co-pending application Ser. No. 473,201 filed May 24, 1974, now abandoned.

BACKGROUND

This invention relates generally to signalling systems for use by the infirm, elderly, etc. to summon aid or assistance as the need arises.

Prior alerting systems, such as those employed in hospital or convalescent facilities, were of the type having connecting leads between an alarm circuit located at a remote location such as a nurse's station, etc., and an actuator button at the bedside of the patient. In such installations, the placement of these leads presented a problem, particularly if the system was installed after the construction of the building was complete. In addition, the cords associated with the actuator button were awkward in that they tended to become tangled in furniture, twisted, kinked, etc. Such systems lacked any degree of portability or flexibility, and were thus useable only by personnel confined in bed or in a single room.

Other signalling systems employing transmitters and receivers have been proposed and produced. One of the problems encountered in such devices was that stray signals (both fundamental and harmonics thereof) from police radios, aircraft, etc. were detected by the receiver, thus often triggering a false alarm. To overcome this, modulation was added to the system such that only a signal on the proper carrier frequency having the proper modulating frequency superimposed thereon would trigger the alarm. Such systems are employed in automatic garage door openers which are currently being manufactured and sold.

The construction of a receiver which responds to only a particular modulating frequency means a multiplicity of additional components as required by the selective circuitry. Typically, tuned filters are employed after the detector, such filters blocking all signals except those on the desired (audio) frequency. Unfortunately, filter components (inductors, capacitors) in the audio range tend to be rather large and bulky. Filters of the active type are tricky to adjust and maintain. As a result, prior transmitter/receiver systems have been rather expensive and complex, and in some cases the reliability has been poor.

SUMMARY

The above disadvantages and drawbacks of prior summoning or signalling systems are obviated by the present invention, which has for an object the provision of a novel and improved personalaid calling system which is simple in construction, extremely reliable in operation and which provides a high degree of flexibility and adaptability to different installations. A related object is the provision of a system as above which can comprise a plurality of essentially identical call-units operating in the same area or locale, without causing interference with one another. A still further object is the provision of a system as above, which gives the user complete freedom to move about, as from one room to another, or even between different floors in the same building without sacrificing the capability of giving an immediate call for assistance, if the need arises.

The above objects are accomplished by a signalling system comprising a radio-type transmitter which can be activated by means of a switch or button, and a receiver/decoder located at an area from which the need for help or assistance can be readily observed. The transmitter unit is adapted to be carried on the person of the user, as for example, in the pocket, and when activated emits short bursts of a modulated carrier signal having a unique frequency, such carrier being received at the receiver and demodulated by a detector or demodulator circuit. Means connected with the detector output, including a gated, resettable counter, are arranged to measure the frequency of the detected signal by counting the uniformly-spaced pulses of the demodulated signal agaist a fixed time interval. Programmable means connected with the counter output are provided for sensing the existence of a signal at the predetermined frequency corresponding to the demodulating frequency of the transmitter, and for triggering an alarm when such a particular frequency is sensed. By such an arrangement, a plurality of essentially identical systems can be used, such systems all operating in the same area by employing slightly different modulating frequencies. Thus, interference between adjacent systems is virtually eliminated.

Other fratures and advantages will hereinafter appear.

In the drawings, illustrating a preferred embodiment of the invention:

Figure 1:
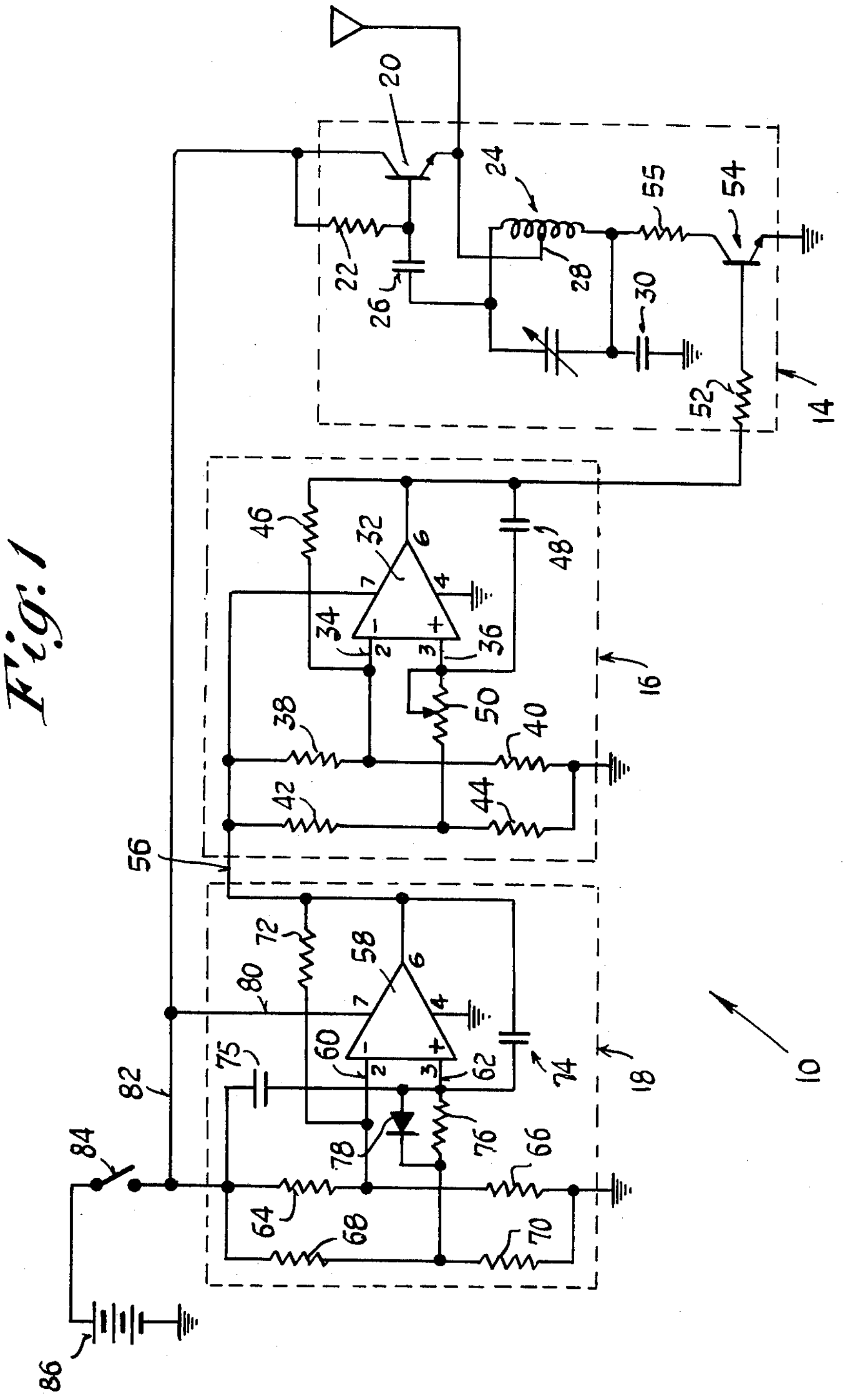
FIG. 1 is a schematic circuit diagram of the transmitter portion of the call-aid system of the present invention, the transmitter being self-contained and powered by a miniature battery.
Figure 2:
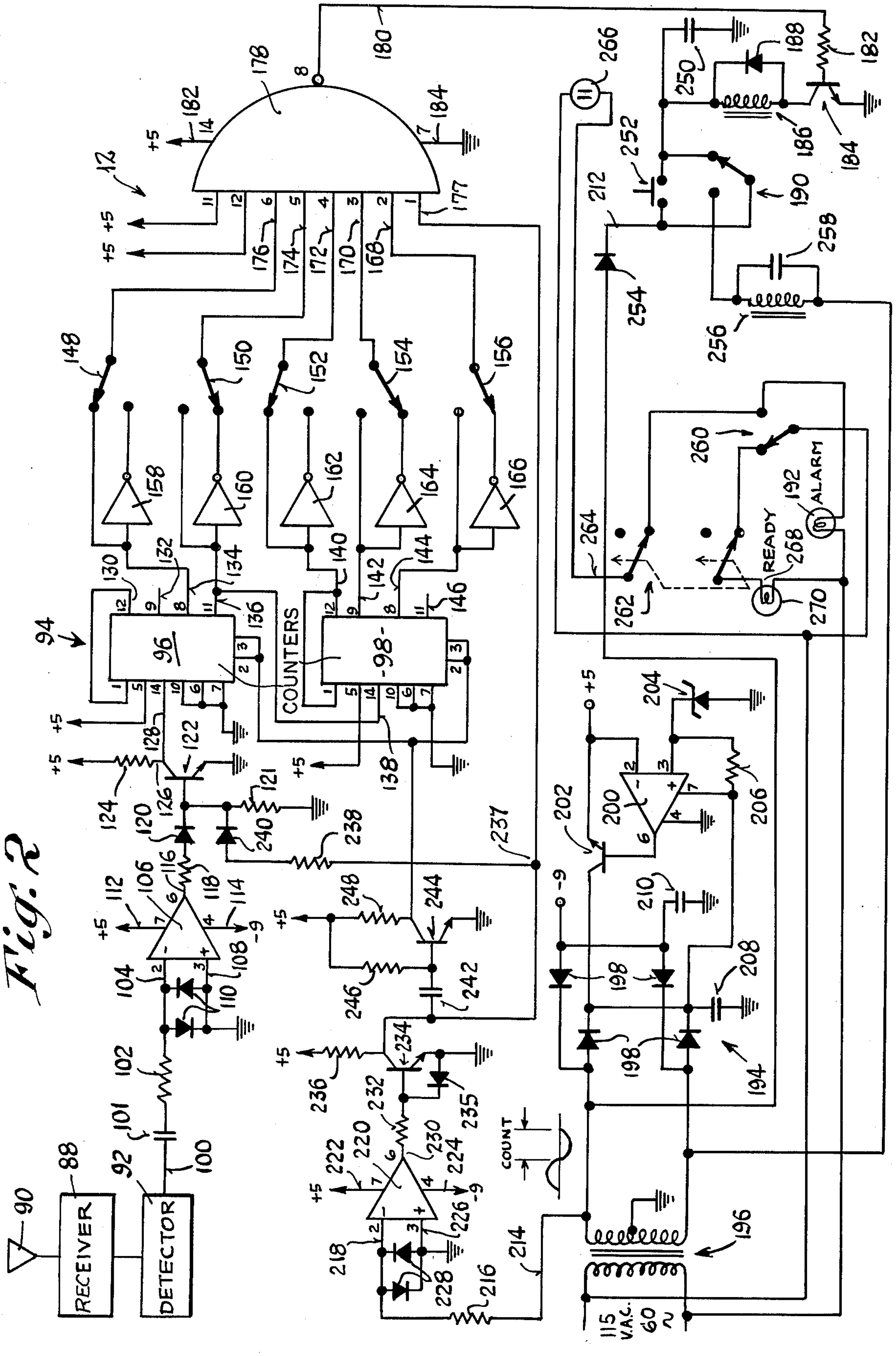
FIG. 2 is a schematic circuit diagram of the receiver, decoder and signal portion of the system of the present invention, this portion being powered by a supply connected to commercial a.c. power mains.

Referring to FIGS. 1 and 2 and in accordance with the present invention, there is provided a personal call-aid system comprising a transmitter unit generally designated by the numeral 10, and a receiver/decoder unit generally designated 12.

Referring for the moment to FIG. 1, the transmitter 10 includes a Hartley oscillator 14, a modulator 16 and a timed pulse generator 18. The oscillator 14 includes a transistor 20 having base bias derived through a resistor 22, a tuned L-C circuit 24 resonant at the desired oscillator frequency, and a coupling capacitor 26. A tap 28 on the coil of the L-C circuit is connected to the emitter of the transistor 20 as shown. One end of the L-C circuit is connected to ground through a capacitor 30. The oscillator is adapted to operate on a carrier frequency of 90-130 MHz, and is adjustable by means of the variable capacitor in the tuned circuit 24.

The modulator comprises an amplifier 32 connected to operate as an oscillator to generate an audio frequency square-wave output which is employed to modulate the Hartley oscillator 14, both in amplitude and frequency. The amplifier has inverting and non-inverting inputs 34, 36, respectively connected to biasing resistors 38, 40 and 42, 44. Negative feedback is provided by resistor 46 connected between the output of the amplifier 32 and the inverting input 34. A capacitor 48 connected between the output and the non-inverting input 36 provides the necessary positive feedback. It, in conjunction with resistor 50, determines the frequency of the square wave which is generated. When a positive d.c. voltage is applied to line 56 (from the pulse generator 18 as described below, the output on terminal 6 of the amplifier 32 will initially step to a particular level at or near one of the normal output voltage limits. This step is coupled to the non-inverting input 36 through the capacitor 48. Assuming a positive-going voltage step at the output, the non-inverting input 36 will be driven positive and the capacitor 48 will then begin to discharge through the variable resistor 50 (and resistor 44). At such time as the voltage on line 36 decreases to a value less than the voltage on line 34, the output on terminal 6 of the amplifier 32 will switch or step to a level at or near ground potential. This negative going step will also be coupled to the non-inverting input 36 through capacitor 48, after which the latter will begin to charge through the variable resistor 50 (and through resistor 42.) When the voltage on line 36 increases to a point wherein it exceeds the voltage on line 34, the amplifier will again assume a positive output on terminal 6. This process continues as long as there is a supply voltage on line 56, as can be understood. It is noted that the resistor 50 is variable and constitutes means for effecting uninterrupted and continuous variation of the modulating frequency of the transmitter 10. The value or setting of the variable resistor 50 varies the rates of both the charge and discharge of the capacitor 48, and thus affects the frequency of the square wave which is generated.

The modulating signal is applied to the Hartley oscillator 14 through a current-limiting resistor 52 which extends to the base of a control transistor 54. It will be understood that when the output of the amplifier 32 (square wave) is high, the transistor 54 will conduct, providing a path for current to flow from the emitter of the oscillator transistor 20 through a resistor 55 connected to one side of the L-C circuit. Conversely, when the output of amplifier 32 is low, negligible base drive flows through the resistor 52, thus cutting off transistor 54, which in turn disables the oscillator 14.

The action by which varying the resistor 50 changes the modulating frequency of the transmitter is more explicitly explained as follows:

Changes in the resistor 50 change the frequency of the square wave applied to the transistor 54, and this in turn changes the voltage experienced by the transistor 20. Such voltage has the result of changing the input capacitance effect of the transistor 20, which of course than acts as a tuning means in conjunction with the coil 24, since it introduces an additional shunt capacitance across the upper portion of the coil, thereby modifying by a slight amount the resonant frequency of the tank circuit, such amount giving rise to frequency deviation or frequency modulation in the carrier signal.

It will be seen that the pulse generator 18 supplies power to the modulator 16 through lead 56. This latter is connected to the output terinal of an amplifier 58, which is also of the high-gain variety and is connected to operate as a low-duty-cycle pulse generator. The amplifier has inverting and non-inverting inputs 60, 62, respectively, which receive biasing voltage from divider resistors 64, 66 and 68, 70. Negative feedback is provided by resistor 72 connected between the inverting input 60 and the output of the amplifier 58. The characteristics of the pulse (pulse length, duty cycle, etc.) are determined by the values of capacitor 74, resistor 76, and by the parallel resistance of resistors 68 and 70.

The operation of the pulse generator 18 is substantially the same as that of the modulator 16, except that the charging and discharging rates of the capacitor 74 are different.

When the output at line 56 is positive, the charge on capacitor 74 will leak off rapidly through diode 78 and the output will immediately drop to almost zero. Capacitor 74 will then charge, but this action will be slow because the charge current must flow through resistor 76. Therefore, the output will be positive for a substantially shorter period of time that it is at (or near) zero. These brief periods of positive voltage, or pulses, will be approximately one second long and will occur every 30 to 45 seconds.

The amplifier 58 has a positive supply lead 80 which is connected to a positive bus 82. A switch 84 is provided, constituting manual control means for enabling actuation of the oscillator and having one terminal connected to the battery 86 as shown. When switch 84 is closed, capacitor 75 couples a single positive pulse into the non-inverting amplifier input 62. This insures that the pulse generator 18 always produces its first pulse the very instant that switch 84 is closed. The positive bus 82 also supplies voltage to the transistor oscillator 14 when the switch is closed. Both amplifiers 32, 58 can be of the type having the commercial designation LM301A, and the pin members associated therewith are shown in FIG. 1.

When it is desired to activate the oscillator 14, the switch 84 is closed, providing energy to the pulse generator 18 and oscillator 14. As noted above, the generator 18 provides short duration positive pulses on line 56, the duration being roughly one second, and the spacing between pulses being roughly 30-45 seconds. During the one second pulse on line 56, the modulator 16 is enabled, generating a square-wave output which is used to modulate the oscillator 14. It will be understood that the latter thus oscillates for one-half of the square wave cycle and shuts off for the other half cycle. The output from the oscillator thus constitutes one second bursts of a carrier wave of 90-130 MHz, modulated by an audio frequency square wave.

FIG. 2 illustrates the receiver-decoder portion of the call-system of the present invention. As shown, there is provided a receiver 88 connected to an antenna 90, the receiver being adapted to receive signals at the carrier frequency of the transmitter (90–130 MHz). The receiver can be of conventional construction, including tuned R.F. input circuitry (not shown) and one or more I.F. stages (also not shown). The latter would in turn drive a detector or demodulator 92 which would operate to recover the information-carrying modulating signal (square wave).

In accordance with the present invention, there is provided a decoder device including a gated, resettable counter, adapted to be driven by the detector 92, for measuring the frequency of the demodulated signal received therefrom. The counter device is generally designated by the numeral 94 and comprises two integrated-circuit type four-bit binary counter modules 96, 98 respectively, with the input of the second module 98 being connected with an output of the first module 96.

The demodulated signal from the detector 92 extends via a line 100 through a coupling capacitor 101 and current limiting resistor 102 to the inverting input 104 of a squaring amplifier 106. This amplifier can be of the integrated circuit variety, identified by the commercial designation LM307, and the pin numbers shown in FIG.

2 are associated with this particular unit. The non-inverting input 108 is grounded as shown, and diodes 110 limit the differential voltage swing between the two inputs 104, 108. Positive and negative supply leads 112 and 114 respectively provide power to the amplifier. The output 116 of this amplifier is connected with another current limiting resistor 118 and an isolation diode 120, which lead to a transistor inverter stage 122 having a base biasing resistor 121 and a collector load resistor 124. The output 126 of this inverter drives the count input terminal 128 of the first counter module 96. The particular module employed is a four-bit binary counter having the commercial designation SN7493. In this particular device, counting is accomplished on the leading edge of a negative-going pulse of signal. The module 96 has a plurality of parallel digital outputs 130, 132, 134 and 136, the first being a divide-by-two output, the second being a divide-by-four output, the third being a divide-by-eight output, and the fourth being a divide-by-sixteen output, all with reference to the frequency of the input signal on line 128. As shown, the divide-by-sixteen output of the first module 96 is fed to the count input 138 of the second module 98. This latter also has a plurality of parallel digital outputs 140, 142, 144, 146, the first output 140 being a divide-by-two, the second output 142 being a divide-by-four, etc. Although in the present embodiment two separate modules 96 and 98 are employed, a single counter with a larger number of bits could readily be employed. The pin numbers shown in FIG. 2 are associated with the particular commercial counter unit designated above.

As shown in FIG. 2, the outputs 134, 136, 140, 142 and 144 are connected respectively to terminals of a plurality of selector switches 148, 150, 152, 154 and 156. In addition, these outputs also extend to the input respectively of a plurality of digital inverters 158, 160, 162, 164, 166, the outputs of the latter extending to other terminals of the switches 148–156 respectively. It is noted that each of the inverters 158–166 merely provides a high level digital output signal for a low level digital input signal and vice-versa. The particular inverters employed are disposed in a single package, having the commercial designation SN7404. In the interest of clarity, the inverters 158–166 are illustrated diagrammatically in FIG. 2, without the (+) and (−) supply terminals.

Connected to the wiper arms of the switches 148–156 is a plurality of leads respectively extending to the inputs of a "NAND" gate 178. This device is identified by the commercial designation SN7430, and the pin numbers shown in FIG. 2 correspond to this particular unit. As shown, a total of eight inputs are available, six of which are used. The remaining two (pins 11, 12) are connected to (+) five volts as shown. This device 178 operates to provide a high-level digial output on line 180 for all circumstances except when all eight of the input terminals have high digital levels impressed thereon, the output assuming a low digital level in this latter case. A lead 182 supplies positive voltage to pin 14 of the gate 178, and a lead 184 grounds the negative supply lead, pin 7.

Connected with the output 180 of the gate is a current limiting resistor 182 extending to the base of a control relay transistor 184, the latter being capable of driving a relay 186. The diode 188 connected across the coil of the relay 186 provides transient protection for the transistor 184. As will be explained below, the relay is normally energized during the operation of the system, and becomes de-energized to actuate the alarm.

As illustrated in FIG. 2, a capacitor 250 is connected from one side of the coil relay 186 to ground. The connections to the coil are such that the latter is energized through its own contacts 190, and through transistor stage 184, when the latter is conducting. A "reset" push button 252 is provided for temporarily bridging several of the contacts 190 so as to permit "latching" of the relay in an energized position. Energization of the relay occurs through a diode 254, constituting a half wave rectifier for providing d.c. voltage to operate the coil of the relay 186. Capacitor 250 constitutes a filter for this d.c. voltage.

Connected to another of the contacts 190 is an additional relay 256, having a capacitor 258 in parallel therewith, the latter, together with diode 254, forming a second half wave rectifier and filter circuit to supply d.c. to the coil of the relay 256. The contacts 260 of this second relay are of the single-pole, double-throw variety, with the common arm extending to one side of the 115 volt a.c. line. One of the contacts 260 is connected with an "alarm" light 192, and another of the contacts 260 extends to a single-throw, double-pole switch 262 which functions as a "test-operate" switch. A line 264 extends from this switch to a socket 266 adapted to receive a plug from a remote alarm device. Another lead 268 extends from the other pole of this switch to a "ready" light 270 which has its other lead connected to one side of the 115 volt a.c. line, as shown. The arrangement is such that with the switch 262 in the "operate" on position, shown in FIG. 2, energization of the relay coil 256 will result in the alarm light 192 being illuminated, and will simultaneously result in a 115 volt a.c. voltage being applied to the socket 266 for activating another alarm circuit, etc. It is noted that when the switch 262 is in the "operate" position with the relay 256 unenergized, the "ready" light 270 will be illuminated, indicating that the system has power applied and is operational. Conversely, with the switch 262 in the "test" position, the voltage which would normally be applied to the socket 266 in the event of the alarm being activated is interrupted, such that the system can be tested in order to determine the operativeness thereof. During such testing, energization of the transmitter 10 will result in the alarm light 192 becoming illuminated, but the socket 266 will remain "cold". It is seen that under these circumstances the "ready" light 270 is not illuminated, which serves as a remainder to reset the switch 262 to the "operate" position following testing.

In FIG. 2, the wiper arm of the contacts 190 is shown in a position corresponding to an energized condition of the relay 186; wiper arm of the contacts 260 is shown in a position corresponding to an unenergized condition of the relay 256. Under such circumstances, the system is operative, but is unactivated as far as the alarm is concerned.

Power for the receiver/decoder is provided by a supply 194 comprising a power transformer 196 running off commercial a.c. power mains and having a secondary winding center-tapped as shown. Diodes 198 provide full wave rectification for a negative supply of (−) nine volts d.c. and a regulated positive supply having an output of (+) five volts. This latter supply is regulated by means of an amplifier 200 having the commercial designation LM-307, a pass transistor 202 having the commercial designation 2N-2218, a zener or reference diode 204, an associated biasing resistor 206, and filter capacitor 208. The negative supply has a filter capacitor 210, but is otherwise unregulated.

In accordance with the present invention, there is provided means derived from the 60 cycle commercial power mains, for enabling the counter 94 for a fractional period of the 60 cycle interval, and for resetting the counter to zero immediately before the commencement of a count interval. As shown, a line 214 extends from one side of the transformer secondary through a current limiting resistor 216 to the inverting input 218 of a squaring amplifier 220 having the commercial designation LM307. The latter has positive and negative supply leads 222 and 224, respectively and a non-inverting input 226. Diodes 228 limit the differential voltage swing between these inputs. The output terminal 230 extends through another current limiting resistor 232 to an inverting transistor stage 234 having a collector load resistor 236. A diode 235 limits the negative input swing of the signal on the base of this stage, to protect the base-emitter junction. The collector had a lead 237 extending to a resistor 238 and diode 240 which in turn are connected to the base of the transistor stage 122. Also connected to the collector of the stage 234 is coupling capacitor 242 which extends to the base of an inverter stage 244. The base bias for the latter is derived through a resistor 246, and the collector load comprises resistor 248. Additionally, the collector of the stage 234 is connected directly to an input 177 of the gate 178.

The operation of the Call-Aid System of the present invention can now be understood referring to FIGS. 1 and 2. The transmitter 10 illustrated in FIG. 1 is adapted to be carried on the person of the individual desirable of obtaining assistance, such as an elderly person, or one confined in a hospital, living alone, etc. The transmitter 10 is normally unenergized with the switch 84 in the open position.

In FIG. 2, the receiver/decoder 12 is disposed at a remote location and is continuously energized by the power supply 194. In the absence of a signal from the transmitter 10, the receiver 88 and detector 92 have negligible a.c. output level on line 116, due to a self-biasing effect of input 104 which tends to drive itself negative in the absence of a signal impressed thereof. With the isolation diode 240 forward biased, the stage 122 is conducting and the output line 126 will have negligible potential; the counter 94 will thus receive no input pulse. Under such circumstances, the parallel digital outputs 130, 132, 134, 136 of the counter module 96, and the outputs 140, 142, 144, 146 of the counter module 98 all assume low or "0" logic levels, since both modules 96 and 98 are reset by a short-duration positive pulse applied to "reset" terminals (pins 2, 3) thereof as a count is begun.

Assuming now that the switch 84 of the transmitter 10 is closed, the latter will generate a composite signal constituted of a 100–110 MHz carrier, modulated by a square wave audio signal generated by the modulator 16. The pulse generator 18 operates to automatically shut off the transmitter after about one second of operation, and to reestablish the signal after a 30–45 second "off" interval. This one-second-on, 30-second-off arrangement of the transmitter is intended to bring the system into compliance with FCC regulations. It is noted that the transmitter will continue this "on-off" sequence indefinitely until switch 84 is again opened.

In FIG. 2, the receiver 88, being always energized, will receive the initial one second burst of signal from the transmitter 10. The composite signal entering the detector 92 will be demodulated, thereby yielding on line 100 a square wave signal having the same frequency as that of the modulator 16. This signal is fed through the squaring amplifier 106, and drives diode 120 alternately into and out of conduction. This results in a square wave signal on line 126, provided that diode 240 is in a non-conductive state, which is fed into the count input terminal 128 of the counter module 96. Each negative going excursion of the input signal results in one count or pulse being tallied by the counter modules 96, 98 for a predetermined count interval. Since counting occurs only while diode 240 is non-conductive, and since this occurs during exactly one-half of each cycle which is at 60 Hz rate. The count interval is 1/120 of a second in length. After the count is completed, the output levels on lines 134, 136, 140, 142 and 144 are sensed by the gate 178 through the inverters 158–166 and switches 148–156. It will be understood that for a given modulating frequency, each of these switches can be programmed or set to one of two positions providing either a digital "1" or a digital "0" signal to the corresponding intput 168–170 of the gate 178. Different combinations of switch positions can be employed to correspond to different modulating frequencies. By such an arrangement, multiple units can be employed in the same area without causing interference with one another. For example, with the switches 148–156 in the positions shown, the outputs of the modules 96, 98 required in order to yield digital "1" signals on inputs 168–176 of gate 178 would be as follows: Line 134 - digital "1"; line 136 - digital "0"; line 140 - digital "1"; line 142 - digital "0"; line 144 - digital "0". It will be understood that only a modulating frequency which yields the counter outputs indicated above will result in digital "1" levels on the inputs 168–176 of gate 178, thus triggering the alarm. Other (adjacent) frequencies will clearly not accomplish this result, and thus the circuit provides immunity against such other frequencies.

When all inputs of the gate 178 gave digital "1" signals applied thereto, the output will have a digital "0", which cuts off the stage 184, thus releasing the normally closed relay 186, thus illuminating alarm light 192 and energizing a remote alarm (not shown) through socket 266. As will be understood, other switch combinations can be used to sense other modulating frequencies.

The counting interval is derived from a commercial a.c. signal on line 214 which is connected to one side of the secondary of the transformer 196. As will be understood, this signal is a sine wave which is fed to the squaring amplifier 220, resulting in a square wave signal (having the same frequency) on line 230. Stage 234 inverts this signal, such that the square wave signal on line 237 is in phase with the sine wave on line 214, and has the same frequency. The signal appearing on line 237 is hereinafter referred to in the claims as a control signal. One-half of the 60 cycle period (1/120 of a second) is employed as the count interval. This count interval corresponds to the negative portion of the 60 cycle period, as shown by the diagram immediately above the transformer 196 in FIG. 2.

The signal on line 237 is fed through isolation diode 240 to periodically bias stage 122 into conduction. When this occurs, the stage 122 no longer responds to any pulses originating from the output of amplifier 106 since the diode 120 becomes reversebiased for one-half cycle. By such an arrangement, counting only occurs when the signal on line 237 is at its low level (near ground potential) for one-half of the 60 cycle period. In addition, the signal on line 237 is employed to reset the counter at the beginning of the count interval by means of a capacitor 242 and in inverter state 244. It will be understood that the square wave signal is differentiated by the capacitor 242 and then inverted by stage 244. The resulting signal on the collector of stage 244 represents a very narrow, positive going pulse of sufficient amplitude to accomplish resetting of the counter modules 96, 98 to zero, but of sufficiently narrow width so as to not materially affect the beginning of the count interval. It will be understood that this positive pulse is very short and occurs at the beginning of the count interval.

During the period of time when the counter modules 96, 98 are operating, the signals appearing on inputs 168–170 of gate 178 are, of course, changing. In order to prevent the gate 178 from inadvertently responding to transients, the line 237 is connected to the input 177 of gate 178. During the count interval, the signal on line 237 is low, thus disabling the gate 178 and preventing inadvertent or transient actuation of the alarm. It is thus seen that, following actuation of the corresponding transmitter, the first negative half cycle of the 60 cycle wave will establish at the inputs 168–176, digital "1" signals which, together with a digital "1" signal on line 237 will activate the alarm. The coil of the relay 186 is connected so as to be normally energized; a single triggering of the relay "releases" it to an unenergized condition, as can be seen from FIG. 1. It will be understood that on successive half cycles, counts substantially identical to those of the initial half cycle will be received by the modules 96, 98 and sensed by the gate 178, but these are of no consequence since the relay coil is open.

It is noted that the outputs 130 and 132 of module 96 are not used. This assures that only every fourth count number can be selected by switches 148–156 (for example 4, 8, 12, 16, 20, etc.). By utilizing only every fourth count, there is no chance of ambiguity due to a count of one pulse extra caused by switching transients. Output 146 of module 98 is not used in this example, but it could be connected to an additional inverter and switch to provide a higher number of possible modulation frequency combinations in dense localities.

As mentioned above, provision is made for adjusting the carrier frequency of the transmitter 10 to correspond to the frequency of the tuned RF circuit in the receiver 88 of FIG. 2. This is accomplished by adjusting the variable capacitor of the tuned circuit 24. In addition, the variable resistor 50 of the modulator 16 permits adjustment of the modulating frequency of the transmitter, so as to enable it to be set properly to correspond to the particular combination of positions of switches 148–156. Such an adjustment would normally be made at the factory by first setting the particular switches to the desired positions, and varying the resistor 50 until digital "1" levels occur on each of the inputs 168–176 of the gate 178, such occurrences being indicated by illumination of the "alarm" light 192.

Changes in the resistance value of the resistor 50 will change the frequency of the square wave applied to the transistor 54, and this in turn changes the voltage experienced by the transistor 20. Such voltage change has the result of changing the input capacitance effect of the transistor 20, which then acts as a tuning means in conjunction with the coil 24, since it introduces an additional shunt capacitance across the upper portion of the coil, thereby modifying by a measurable amount the resonant frequency of the tank circuit, such amount giving rise to frequency deviations or frequency modulation in the carrier signal. These frequency changes are readily apparent. In effecting such variations of frequency, the transistor 20 of the circuit of FIG. 1 constitutes the tunable reactance.

By way of further explanation, the mechanism of frequency modulation, in the case of FIG. 1 depends upon the transistor 20 providing a small amount of incidental capacitance which adds to the tuning capacitance of the tank circuit 24. This incidental capacitance changes in value when the collector-to-emitter voltage of the transistor 20 is changed. Therefore, as the transistor 54 is turned from its off, or non-conducting condition to its on or fully-conducting condition, the voltage from collector to emitter of the transistor 20 swings through a range sufficient to affect its base capacitance, and hence to shift the carrier frequency by a slight amount.

From the above it can be seen that I have provided a novel and improved Personal Aid Call System which is simple in construction, reliable in operation and wherein the transmitter is completely portable. Readily available components are used throughout, thus keeping the cost as low as possible. Extensive use of integrated circuits makes possible small physical size and little interconnecting circuitry.

The present invention is in sharp contrast to, and distinguishes from prior electronic devices intended for short range radio signalling in that the recognition process in the receiver of this invention utilizes a frequency-dividing counter working in conjunction with an exact, fixed interval of time derived from the commercial 60-cycle supply to determine whether or not to trigger the alarm, by a process involving continuous counting of all pulses of the detected signal, regardless of frequency, pulse spacing, or relationship, whereas the prior art utilizes shift registers which do not respond to all pulses that are detected but instead only to pre-established patterns of pulses. It is thus seen that the mode of operation of the present receiver is wholly different from devices employing shift registers and the like.

The provision of the selector switches enables rapid programming of a particular decoder to its respective transmitter unit.

The device is thus seen to represent a distinct and advance improvement in the technology of call-aid systems.

Each and every one of the appended claims defines a distinct aspect of the invention separate from the others, and each claim is accordingly to be treated in this manner when the prior art devices are examined in any determination of novelty or validity.

Variations and modifications are possible without departing from the spirit of the invention.

I claim:

1. A personal-aid call system for activating a remote alarm signal, comprising in combination:

a. a self-contained portable transmitter adapted to be carried by a person, said transmitter generating a composite output signal characterized by a carrier frequency and a modulating frequency, b. manual control means for enabling actuation of said transmitter, at will, by said person, c. a receiver tuned to receive said composite signal, said receiver having a detector for demodulating the composite signal to yield a demodulated signal having a frequency characterized by a fixed relationship to that of the modulating frequency, d. decoder means including a gated, resettable counter device of the frequency divider type, e. means for generating a control signal which is independent of the composite output signal, to gate said frequency-divider type counter device thereby enabling the counter device over a predetermined counting interval of time, f. said counter device being connected to the detector output of said receiver for measuring the frequency of the demodulated signal by counting consecutive, uniformly spaced cycles thereof over said predetermined counting interval of time, g. means connected with said control signal generating means for periodically resetting the counter device to zero, h. said counter device having a plurality of parallel, digital output terminals, i. said decoder means including a plurality of manually selectable switches respectively connected to at least some of the digital output terminals of the frequency-divider type counter device, j. said decoder means further including a plurality of digital inverters connected respectively in line with at least some of said counter device output terminals and connected respectively with said switches, k. a gate having multiple inputs connected with said switches, respectively, for sensing a condition wherein there is a uniform digital voltage level on all of said gate inputs, l. indicating means connected with said decoder means for providing an alarm when a particular modulating frequency is detected by the counter device whereby the user, when needing assistance, actuates the transmitter which in turn triggers the alarm for the purpose of alerting others to the existence of such a need, and m. means associated with said control signal generating means for momentarily disabling the alarm during said predetermined counting interval of time, thereby preventing inadvertent actuation of the alarm while the counter device is tallying a count.

2. A personal aid call system as in claim 1, and further including:

a. means for effecting uninterrupted and continuous variation in the modulating frequency of the transmitter, thereby to enable the transmitter to be set so as to provide any one of a number of different useful composite output signals containing correspondingly different modulating frequencies, and to enable similar transmitters to be employed in adjacent localities without interference to neighboring receivers.

3. The invention as defined in claim 1, wherein:

a. said control signal generating means provides a gating signal to the counter device, derived from substantially constant-frequency a.c. commercial power mains, said gating signal having a fixed time relation to the frequency of said a.c.

4. The invention as set forth in claim 1, wherein:

a. said switches each have at least two terminals corresponding to two switch positions, and also having wiper arms, b. one terminal of each switch being conneced respectively to the inputs of the inverters, another terminal of each switch being connected respectively to the outputs of said inverters, whereby for any digital output of the counter device, the switches can be thrown to positions providing similar digital levels on the wiper arms of the switches.

5. The invention as set forth in claim 4, wherein:

a. said gate is of the "AND" variety, having its multiple inputs connected with the wiper arms of the switches, respectively.

6. The invention as defined in claim 1, and further including:

a. latching means interposed between said decoder means and said alarm for maintaining the latter permanently activated until resetting following an initial activation.

* * * * *